United States Patent
Bower et al.

(10) Patent No.: US 9,603,498 B2
(45) Date of Patent: Mar. 28, 2017

(54) SEPARATING APPARATUS IN A VACUUM CLEANER

(71) Applicant: Dyson Technology Limited, Wiltshire (GB)

(72) Inventors: Andrew James Bower, Shropshire (GB); Alejandro Ricardo Ortega Ancel, London (GB)

(73) Assignee: Dyson Technology Limited, Malmesbury, Wiltshire (GB)

(*) Notice: Subject to any disclaimer, the term of this patent is extended or adjusted under 35 U.S.C. 154(b) by 155 days.

(21) Appl. No.: 14/610,518

(22) Filed: Jan. 30, 2015

(65) Prior Publication Data
US 2015/0216382 A1 Aug. 6, 2015

(30) Foreign Application Priority Data

Jan. 31, 2014 (GB) .................................. 1401691.9

(51) Int. Cl.
*B01D 50/00* (2006.01)
*A47L 9/16* (2006.01)
(Continued)

(52) U.S. Cl.
CPC ............. *A47L 9/1608* (2013.01); *A47L 9/102* (2013.01); *A47L 9/16* (2013.01); *A47L 9/1625* (2013.01);
(Continued)

(58) Field of Classification Search
CPC ........ A47L 9/1608; A47L 9/1683; A47L 9/16; A47L 9/102; A47L 9/1625; A47L 9/1633;
(Continued)

(56) References Cited

U.S. PATENT DOCUMENTS 3,543,325 A 12/1970 Hamrick
6,896,720 B1 5/2005 Arnold et al.
(Continued)

FOREIGN PATENT DOCUMENTS

DE 38 43 094 7/1989
EP 1 707 094 10/2006
(Continued)

OTHER PUBLICATIONS

International Search Report and Written Opinion mailed Apr. 30, 2015, directed to International Application No. PCT/GB2015/050201; 9 pages.

(Continued)

*Primary Examiner* — Dung H Bui
(74) *Attorney, Agent, or Firm* — Morrison & Foerster LLP

(57) ABSTRACT

A vacuum cleaner having a vac motor and a separating assembly for separating out dust particles entrained in an airflow drawn through the separator by the vac motor. The separating assembly is a multi-stage separating assembly comprising a primary separation stage and a secondary, non-cyclonic separation stage which is downstream of the primary separation stage, the non-cyclonic separation stage comprising a flow bend for changing the direction of the airflow thereby to separate out dust particles entrained in the airflow. A primary dust collector is provided for collecting dust particles separated out by the first separation stage, and a secondary dust collector is provided for collecting the dust particles separated out by the flow bend, wherein the primary dust collector at least partly surrounds the secondary dust collector.

7 Claims, 7 Drawing Sheets

(51) Int. Cl.
  *B01D 45/08* (2006.01)
  *B01D 45/16* (2006.01)
  *A47L 9/10* (2006.01)

(52) U.S. Cl.
  CPC ............ *A47L 9/1633* (2013.01); *A47L 9/1658* (2013.01); *A47L 9/1683* (2013.01); *B01D 45/08* (2013.01); *B01D 45/16* (2013.01); *A47L 9/165* (2013.01)

(58) Field of Classification Search
  CPC ....... A47L 9/1658; A47L 9/165; B01D 45/08; B01D 45/16; B04C 3/04
  See application file for complete search history.

(56) References Cited

U.S. PATENT DOCUMENTS

| | | | |
|---|---|---|---|
| 7,343,641 | B2 | 3/2008 | Shanor |
| 2003/0150198 | A1 | 8/2003 | Illingworth et al. |
| 2005/0166560 | A1 | 8/2005 | Takemoto et al. |
| 2006/0230721 | A1 | 10/2006 | Oh et al. |
| 2006/0230723 | A1 | 10/2006 | Kim et al. |
| 2006/0230726 | A1 | 10/2006 | Oh et al. |
| 2007/0144116 | A1 | 6/2007 | Hong et al. |
| 2007/0214754 | A1* | 9/2007 | Kim ...................... A47L 9/1608 55/345 |
| 2007/0289263 | A1 | 12/2007 | Oh et al. |
| 2008/0223010 | A1 | 9/2008 | Han et al. |
| 2009/0100810 | A1 | 4/2009 | Smith |
| 2010/0242221 | A1 | 9/2010 | Horne et al. |
| 2012/0000029 | A1 | 1/2012 | Nicolaou et al. |
| 2012/0167337 | A1 | 7/2012 | Horne et al. |
| 2012/0284956 | A1 | 11/2012 | Follows |
| 2013/0091814 | A1 | 4/2013 | Smith |
| 2015/0113762 | A1 | 4/2015 | Robertson |
| 2015/0216382 | A1* | 8/2015 | Bower ...................... A47L 9/16 55/320 |
| 2015/0216383 | A1 | 8/2015 | Bower et al. |
| 2015/0216384 | A1 | 8/2015 | Bower et al. |

FOREIGN PATENT DOCUMENTS

| | | |
|---|---|---|
| EP | 2 028 988 | 12/2007 |
| EP | 2 413 769 | 10/2010 |
| EP | 2 279 685 | 2/2011 |
| EP | 2 028 989 | 10/2013 |
| GB | 2475312 | 5/2011 |
| GB | 2481608 | 1/2012 |
| GB | 2492743 | 1/2013 |
| JP | 2012-236027 | 12/2012 |
| JP | 2013-230406 | 11/2013 |
| KR | 10-0778123 | 11/2007 |
| WO | WO-2007/145413 | 12/2007 |
| WO | WO-2010/112897 | 10/2010 |

OTHER PUBLICATIONS

Search Report dated May 22, 2014, directed to GB Application No. 1401691.9; 1 page.

Bower et al., Office Action mailed Mar. 11, 2016, directed to U.S. Appl. No. 14/610,545; 11 pages.

\* cited by examiner

SEPARATING APPARATUS IN A VACUUM CLEANER

REFERENCE TO RELATED APPLICATIONS

This application claims the priority of United Kingdom Application No. 1401691.9, filed 31 Jan. 2014, the entire contents of which are incorporated herein by reference.

FIELD OF THE INVENTION

The present invention relates the field of vacuum cleaners, particularly to the design of separating apparatus used in vacuum cleaners.

BACKGROUND OF THE INVENTION

Modern vacuum cleaners are typically either "bagged" or "bagless".

Bagged machines can suffer loss of suction during use, which is caused by a progressive blocking of the pores of the filter bag with dust.

Bagless machines typically rely on cyclonic dust separation rather than a filter bag. These machines maintain much better suction than bagged machines, because cyclonic separators do not tend to block as easily as filter bags. But cyclonic separators are relatively complex in layout compared to a filter bag—which can make them difficult to package effectively in the machine. This difficulty increases with dual-stage cyclonic separating apparatus, which may require relatively complicated ducting paths to connect the two cyclonic stages making up the separating apparatus.

SUMMARY OF THE INVENTION

According to the present invention, there is provided a vacuum cleaner comprising a vac motor and a separating assembly for separating out dust particles entrained in an airflow drawn through the separator by the vac motor, the separating assembly being a multi-stage separating assembly comprising a primary separation stage and a secondary, non-cyclonic separation stage which is downstream of the first separation stage, the non-cyclonic separation stage comprising a flow bend for changing the direction of the airflow thereby to separate out dust particles entrained in the airflow, a primary dust collector being provided for collecting dust particles separated out by the first separation stage, a secondary dust collector being provided for collecting the dust particles separated out by the flow bend, wherein the primary dust collector at least partly surrounds the secondary dust collector.

The flow bend is non-cyclonic and therefore does not require the complicated ducting schemes typically associated with cyclonic separation stages (particularly multi-cyclonic stages), nor the use of relatively space-inefficient cyclone chambers. Consequently, the multi-stage separator can be packaged more efficiently on the machine. On the other hand, because the flow bend does not require a filter bag, the flow bend does not suffer the problem of blocking of the filter bag and consequent loss of suction.

The primary dust collector may completely surround the secondary dust collector, so that the secondary dust collector is nested inside the primary dust collector.

The first separation stage may be a cyclonic separation stage, preferably a single-cyclone stage. The single-cyclone stage may comprise an annular bin, with the secondary dust collector being nested inside the bin. In this arrangement, an upper part of the bin may function as a single, annular cyclone chamber and a lower part of the bin may function as the primary dust collector.

In particular embodiments, the secondary dust collector comprises an opening, the flow being formed by a partition which divides the opening into a flow bend inlet and a flow bend outlet, the partition extending part-way into the secondary dust collector so that the airflow entering through the flow bend inlet is then forced to bend around the partition inside the secondary dust collector before exiting through the flow bend outlet. This is a simple, compact layout for the flow bend, in which the flow bend is effectively located inside the secondary dust collector.

The opening to the secondary dust collector may annular or circular, the partition extending around the full circumference of the opening so as to define an annular flow bend inlet and annular flow bend outlet. This provides for a full "360-degree" flow bend which helps minimize the flow restriction presented by the flow bend, reducing pressure losses in the separating apparatus.

The flow bend inlet is preferably formed by the partition and an outer wall of the secondary dust collector. This is a simple configuration which can be formed without any undercut, reducing tooling costs.

The secondary dust collector may itself be annular. In this case, the flow bend outlet may be formed by the partition and an inner wall of the dust collector. Again, this can reduce tooling costs.

BRIEF DESCRIPTION OF THE DRAWINGS

Embodiments of the invention will now be described with reference to the accompanying drawings, in which.

DETAILED DESCRIPTION OF THE INVENTION

Figure 1:
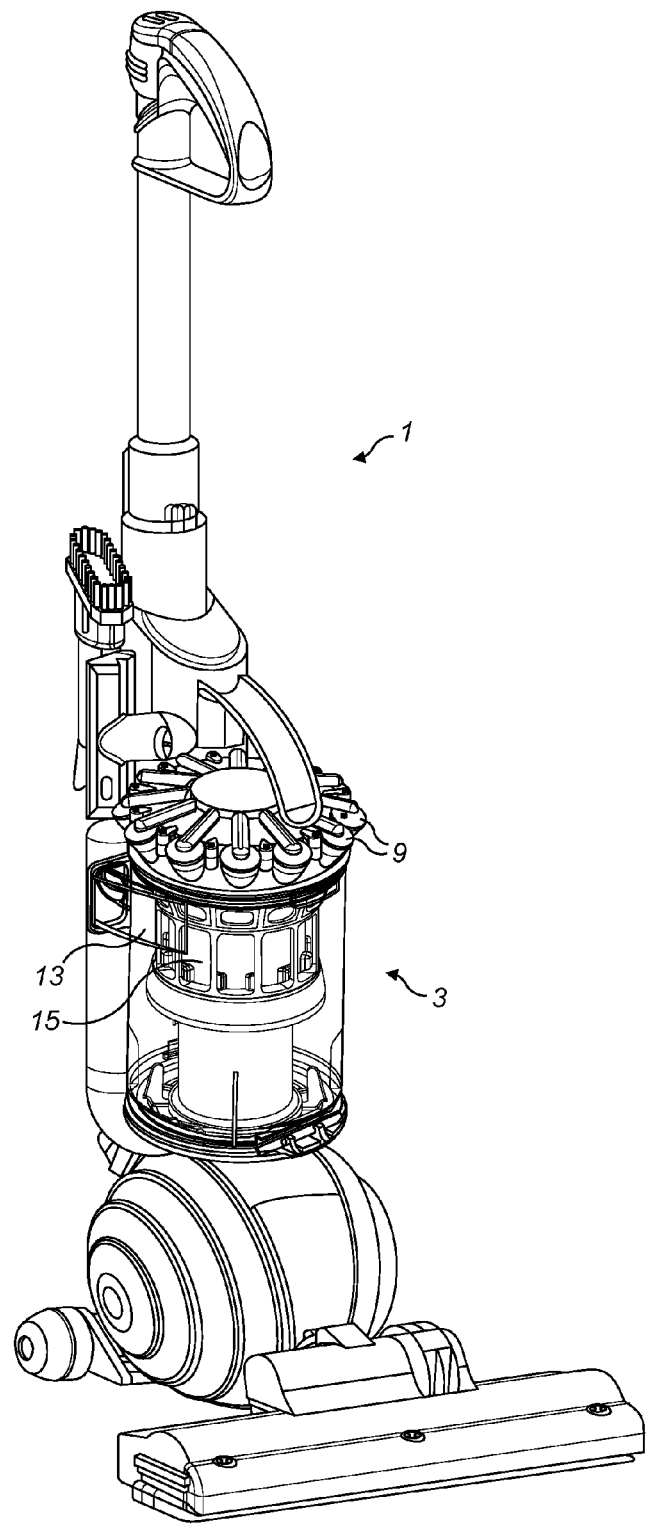
FIG. 1 is a perspective view showing a conventional bagless vacuum cleaner.

FIG. 1 illustrates a conventional vacuum cleaner 1 having a dual-stage cyclonic dust separating apparatus 3.

Figure 2:
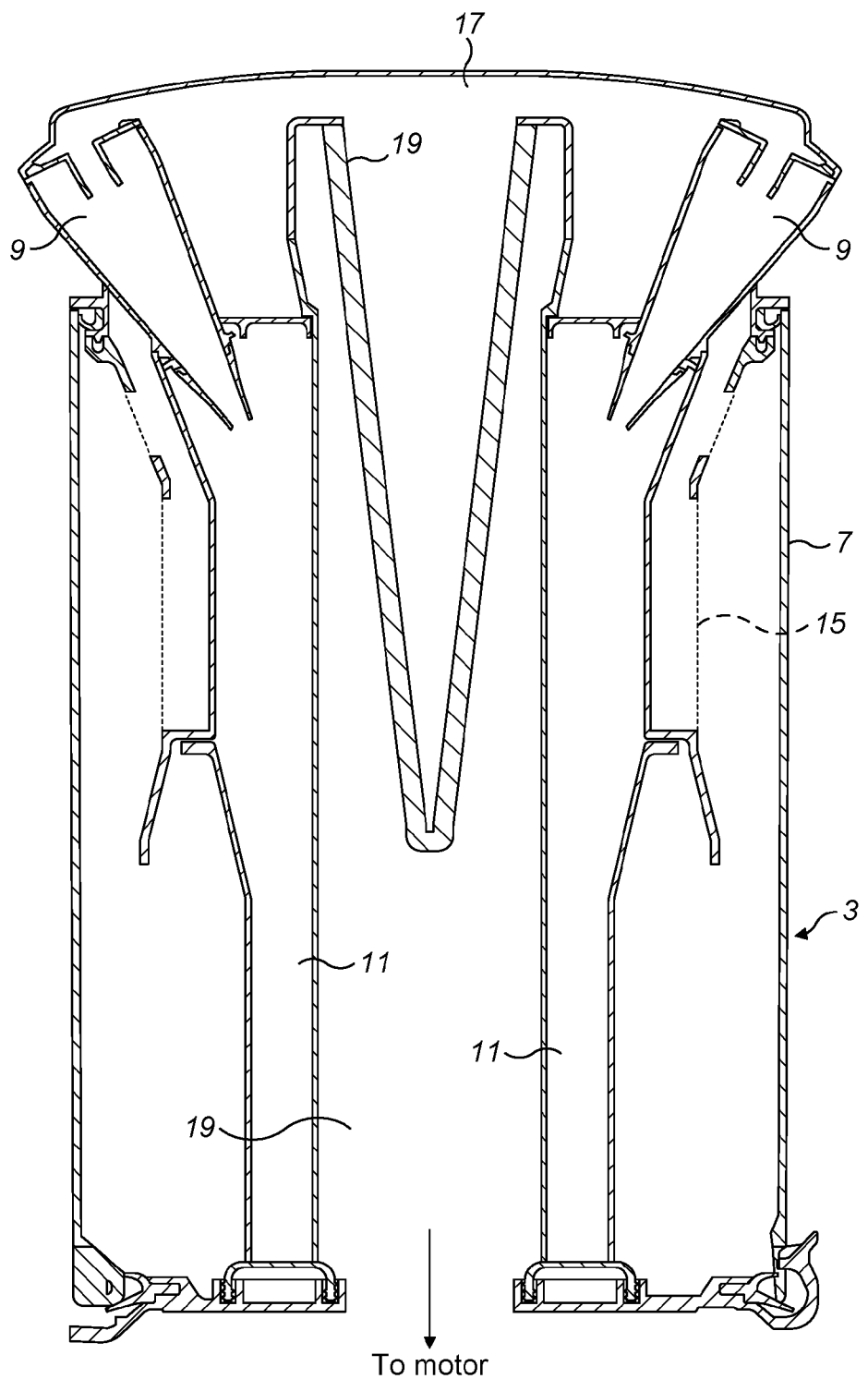
FIG. 2 is a cross-sectional view through a conventional dual-stage dust separator.

FIG. 2 is a section through the cyclonic dust separating apparatus 3. Here the first cyclonic stage—or 'primary'—comprises a relatively large, cylindrical, outer bin 7 which acts both as a container for the primary cyclone and as a primary dust collector. The second cyclonic stage is a multi-cyclonic stage comprising a plurality of smaller, tapered cyclone chambers 9 arranged in parallel above the bin 7, which each feed into an annular secondary dust collector 11—or 'Fine Dust Collector (FDC)'—nested inside the bin 7.

The dirty air enters the bin 7 through a tangential inlet 13 in the wall of the bin 7. This helps to impart the necessary spin to the airflow inside the bin 7, and the separated dirt collects at the bottom of the bin 7. The air exits the primary through a cylindrical mesh outlet—or 'shroud'—15 which forms an annular duct externally around the outside of the FDC 11, leading up to the secondary cyclonic stage. The air exits the secondary cyclone chambers 9 through the top and is then collected in a manifold 17 and ducted down through the centre of the annular FDC to the vac-motor (not shown), via a sock filter 19 (for separating very fine particles still remaining in the airflow).

Figure 3:
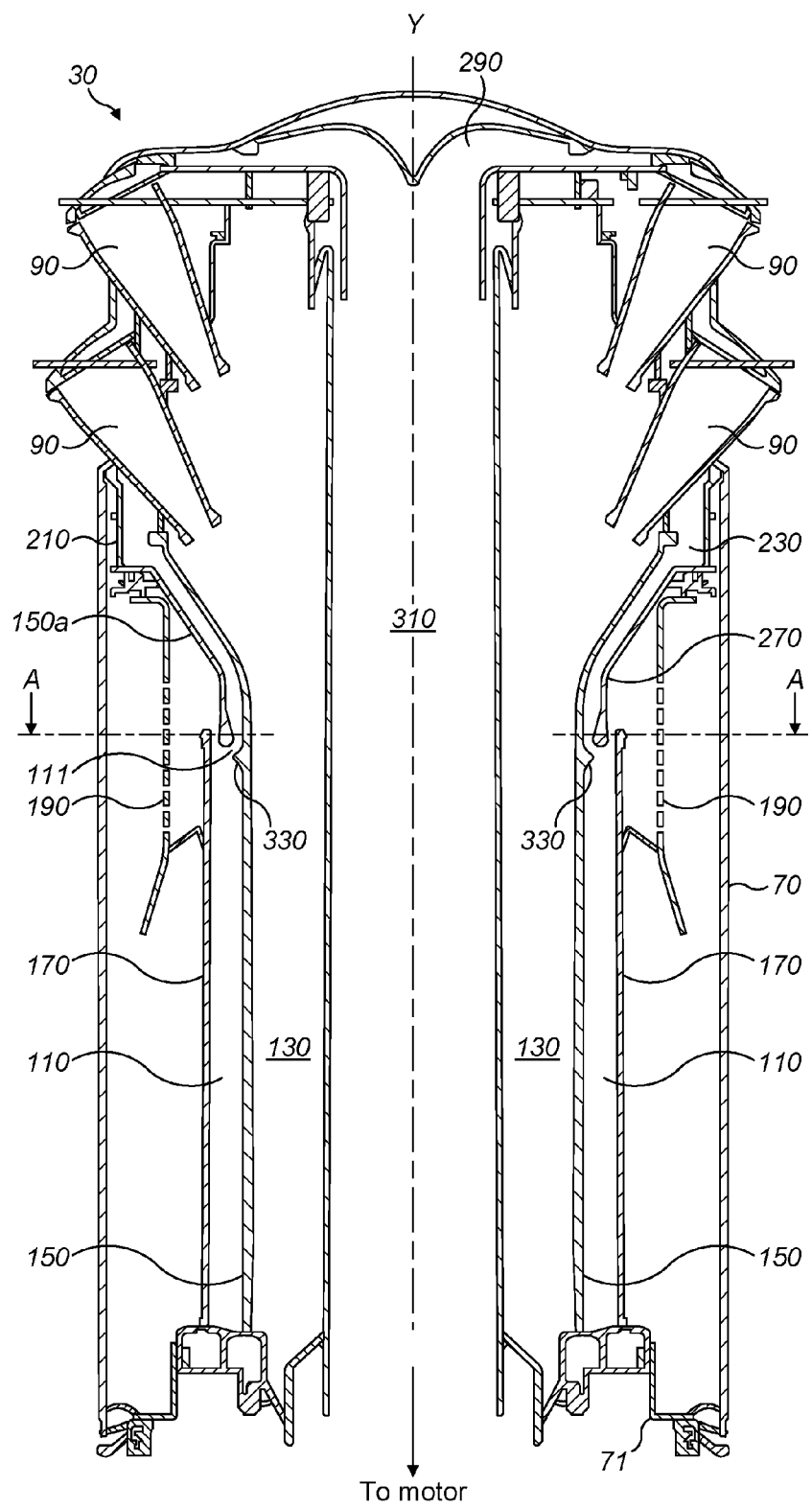
FIG. 3 is a cross-sectional view through a multi-stage dust separator according to the present invention.

FIG. 3 is a section through a multi-stage separating apparatus 30 according to the present invention. Here, the primary cyclonic stage likewise comprises a relatively large, cylindrical bin 70, with the upper part of the bin 70 functioning as a single, annular cyclone chamber and the lower part of the bin 70 functioning as a primary dust collector. The separator 10 similarly comprises a downstream multi-cyclonic stage comprising a plurality of smaller, tapered cyclone chambers 90 arranged in two parallel tiers above the bin 70, and which feed into a dust collector 130 nested inside the bin 70. The dust collector 130 is annular and surrounds a central duct 310 which extends down from a manifold 290 connected to the air outlets of the cyclone chambers 90.

In accordance with the invention, an additional, non-cyclonic separation stage is provided in-between the primary cyclonic stage and the downstream multi-cyclonic stage. Consequently, there are three stages of separation, not two: a primary, cyclonic stage; a secondary, non-cyclonic stage and a tertiary, multi-cyclonic stage.

The secondary, non-cyclonic stage of separation comprises an annular, secondary dust collector 110 and a non-cyclonic dust separator, both of which are housed inside the bin 70.

The secondary dust collector 110 surrounds the tertiary dust collector 130. The secondary dust collector 110 and tertiary dust collector 130 share a common dividing wall 150, which constitutes both the outer wall of the tertiary dust collector 130 and the inner wall of the secondary dust collector 110. This common dividing wall 150 extends the full length of the bin 70 and incorporates a flared upper section 150a for accommodating the lower ends of some of the cyclone chambers 90.

The outer wall 170 of the secondary dust collector 110 extends only part way up the bin 70 and so defines an annular opening 111 between the outer wall 170 of the secondary dust collector 110 and the inner wall of the secondary dust collector (i.e. the common dividing wall 150). The outer wall 170 of the secondary dust collector 110 constitutes a common dividing wall between the secondary dust collector 110 and the surrounding primary dust collector at the bottom of the bin 70.

The three dust collectors 70, 110, 130 are open at their lower ends. The open lower ends are partitioned by the respective common dividing walls 150, 170. A common, hinged cover member 71 is provided which closes off the open lower ends of the dust collectors 70, 110, 130 for simultaneous emptying of the three collectors 70, 110, 130. The cover member 71 seals against the two common dividing walls 150, 170, the wall of the perimeter wall of the bin 70 and the wall of the duct 310.

A sealing collar 210 is located around the inside of the upper end of the bin 70. This sealing collar 210 defines an annular duct 230 around the outside of the tertiary dust collector 130, which leads up to the multiple inlets of the cyclones 90.

A cylindrical mesh shroud 190 encloses the open upper end of the secondary dust collector 110. The shroud 190 is fixed near its lower end to the outer wall 170 of the secondary dust collector 110 and at its upper end to the collar 210.

The secondary non-cyclonic dust separator comprises a flow bend 250 inside the second dust collector 110 for changing the direction of the airflow thereby to separate out dust particles from the airflow. The flow bend 250 is formed by a partition 270 which extends concentrically around the outside of the tertiary dust collector 130, behind the shroud 190. An upper end of the partition 270 is fixed to the collar 210 and the partition 270 extends down from the collar 210 to form an extension of the annular duct 230. The partition 270 extends down through the annular opening 111 and part way into the secondary dust collector 110. The partition 270 thus divides the annular opening 111 into an annular flow bend inlet 250a which connects upstream to the inside of the bin 70 through the shroud 190, and an annular flow bend outlet 250b which connects downstream to the annular duct 230. The lower end of the partition 270 is profiled to form a tapered inlet section 250c of the flow bend 250 immediately downstream of the flow bend inlet 250a and a reverse-tapered outlet section 250d of the flow bend 250 immediately upstream of the flow bend outlet 250b. In the middle section of the flow bend 250, between the two tapered sections 250c, 250d, the partition 270 is radiused to form a curved inner wall 250e of the flow bend 250.

Figure 4:
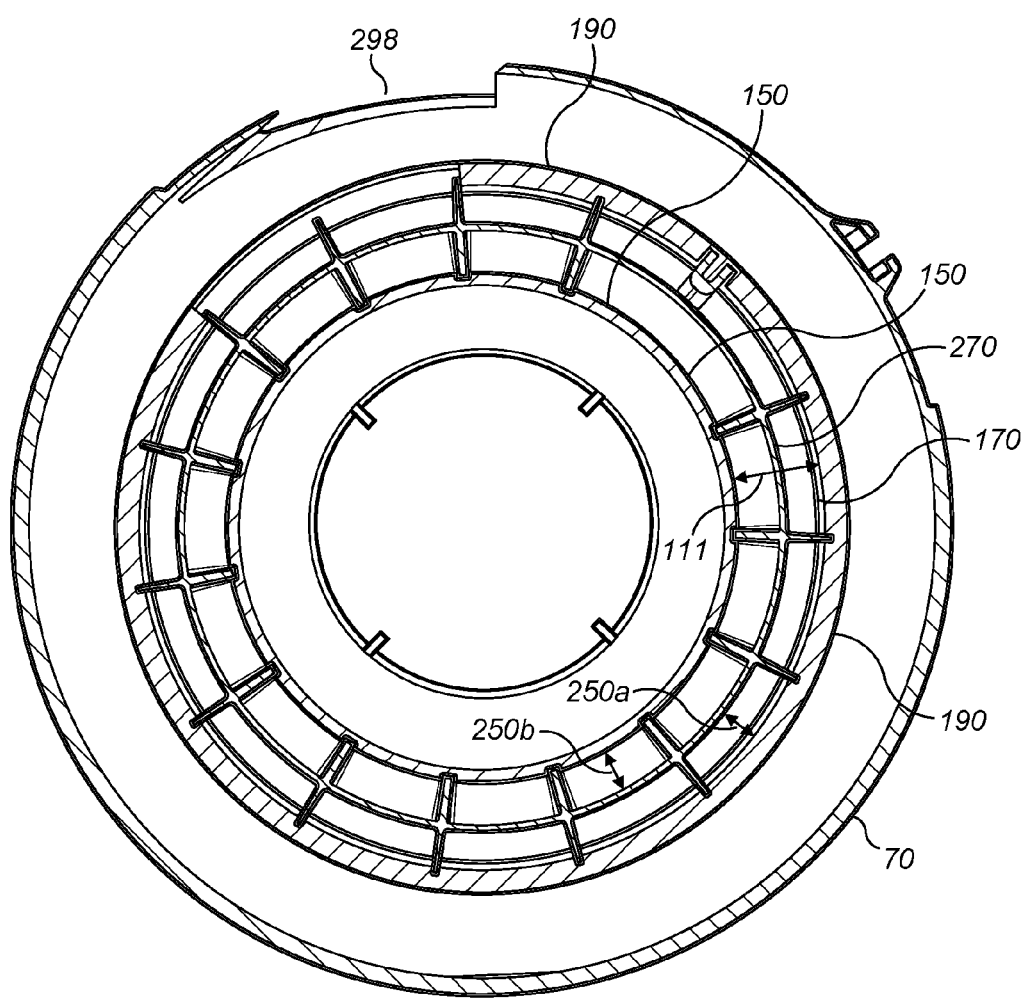
FIG. 4 is a sectional view taken along A-A in FIG. 3.
Figure 5:
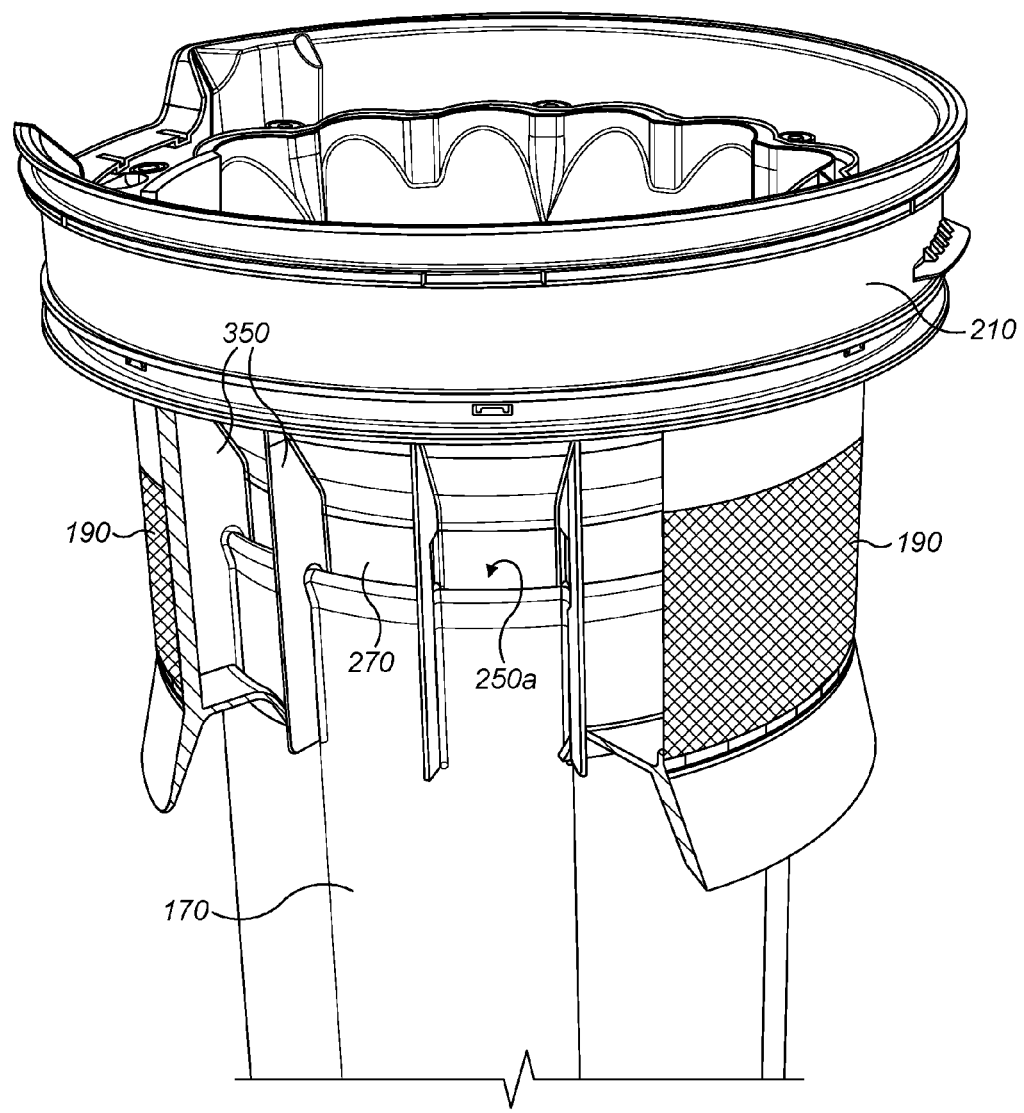
FIG. 5 is a cutaway perspective view of a non-cyclonic separation stage forming part of the dust separator in FIG. 3.

In use, the dirty airflow enters the separating apparatus 30 through a tangential inlet 298 (FIG. 4) in the wall of the bin 70. Low efficiency cyclonic separation takes place inside the bin 70 (owing to its relatively large radius) which separates out relatively large dust particles from the airflow. These large dust particles collect in the bottom of the bin 70. The airflow then exits the primary cyclonic stage through the mesh shroud 190 and enters the secondary non-cyclonic stage. In the secondary stage, the airflow enters the flow bend 250 through the flow bend inlet 250a and is then forced to bend around the partition 270 inside the secondary dust collector 110 before exiting through the flow bend outlet 250b. The two tapered sections 250c, 250d of the flow bend 250 combine to accelerate the airflow into the flow bend 250 and then decelerate the airflow exiting the flow bend 250.

This relatively rapid change in the velocity of the airflow around the partition 270 separates out intermediate-size dust particles still entrained in the airflow. The dust separated out by the flow bend 250 is then collected in the secondary dust collector 110.

Airflow exiting the flow bend 250 is ducted up to the tertiary cyclonic stage via the annular duct 230 where it is distributed between the cyclone chambers 90. High efficiency cyclonic separation takes place inside these cyclone chambers (owing to their relatively small radius) which separates out fine dust particles still entrained in the airflow after it exits the secondary stage. These separated fine dust particles are then collected in the tertiary dust collector 130.

The clean airflow exits the tertiary cyclonic stage and is then ducted to the vac-motor via the common manifold 290 and associated ducting 310.

As and when required, the three dust collectors 70, 110, 130 are emptied simultaneously by manually opening the hinged cover member 71.

There is no filter in the separating apparatus 30. Instead, fine particulates are separated out by the tertiary cyclonic stage. This is made possible through introduction of the secondary non-cyclonic separator which removes intermediate-size dust particles upstream of the cyclone chambers 90. Consequently, the cyclone chambers 90 can be designed with a tight chamber-radius for relatively high-efficiency separation of very fine particulates, without risk of being overloaded with intermediate size dust particles. This is achieved using a space efficient, non-cyclonic arrangement of secondary separator which does not suffer the drawbacks of filter bags (or filters generally).

Any reduction in chamber radius for the tertiary cyclone chambers 90 will tend to increase the pressure drop across the tertiary stage. However, this is offset by increasing the number of parallel cyclone chambers 90 in the tertiary stage. The chambers 90 are nevertheless packaged in a space-efficient manner by 'stacking' the parallel cyclone chambers in tiers, one on top of the other, as shown in FIG. 3—see also UK Patent Publication No. GB2475312.

A baffle 330 is provided inside the secondary dust collector 110 for shielding the collected dust 112 inside the secondary dust collector 110 from the airflow passing around the partition 270. This prevents re-entrainment of the collected dust back into the flow bend 250, improving separation efficiency.

The baffle 330 is provided on the inner wall 150 of the secondary dust collector 110, on the outlet side of the partition 270: for shielding the collected dust from the airflow exiting the flow bend outlet 250b. This helps prevent a "short-circuit" re-entrainment path directly through the flow bend outlet 250b.

The baffle 330 is located in proximity to the partition 270. The upper surface of the baffle 330 is scooped to form a curved outer wall 250f of the flow bend 250. This curved outer wall 250f of the flow bend 250 is generally concentric with the inner wall 250e of the flow bend 250. This helps maintain a stable mean velocity for the airflow as it bends around the lower edge of the partition 270.

Figure 6:
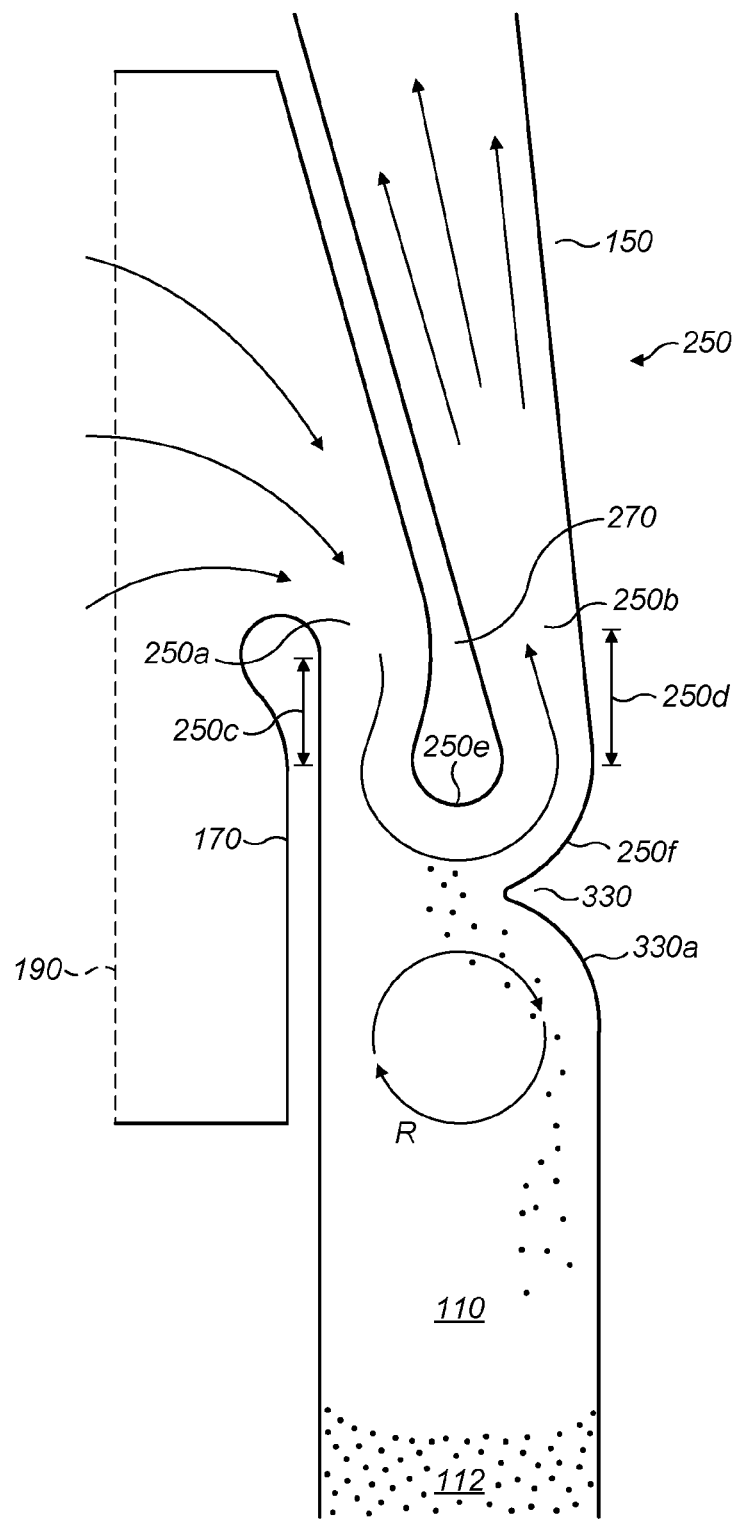
FIG. 6 is a schematic sectional view illustrating the airflow through the non-cyclonic separation stage in FIG. 5.
Figure 7:
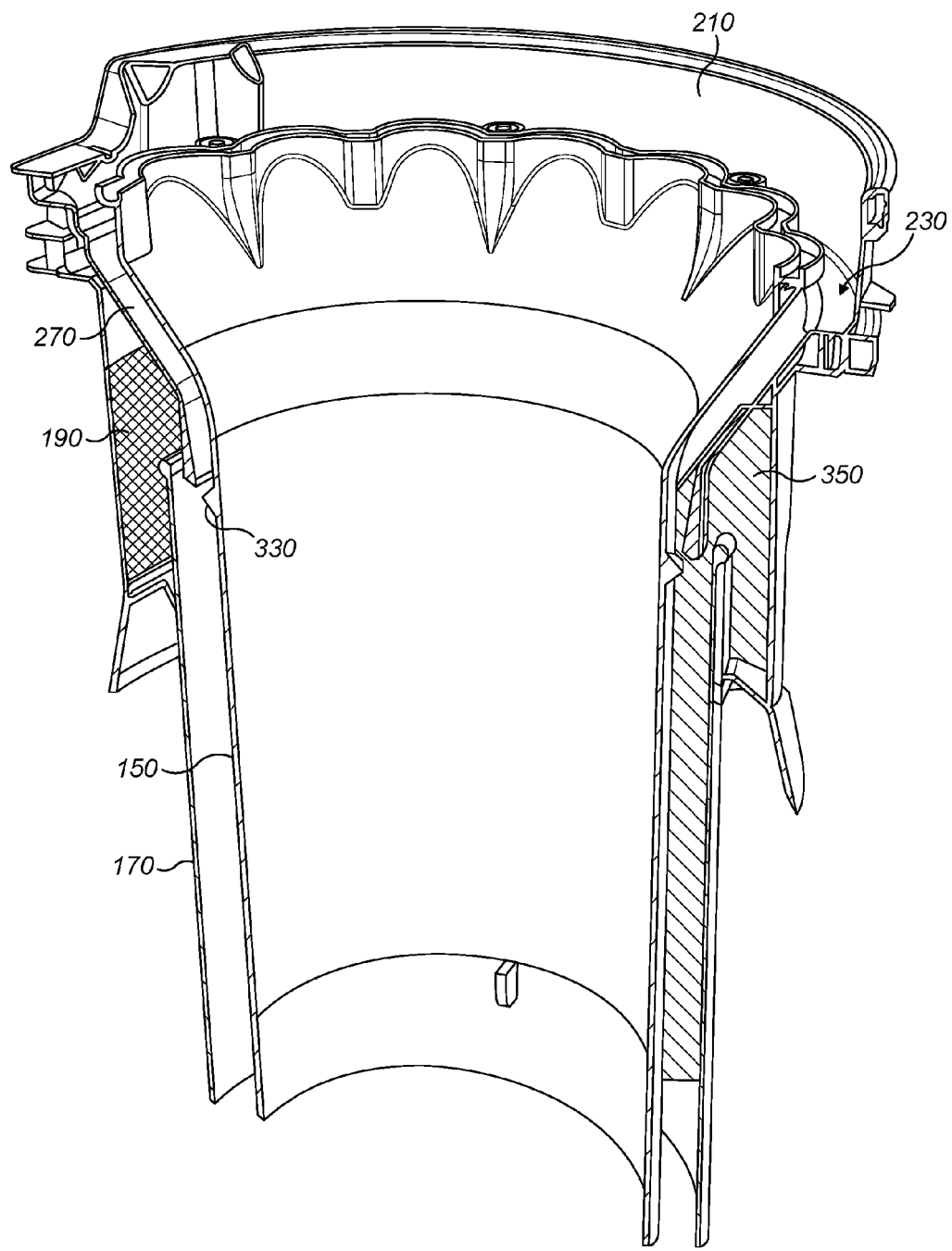
FIG. 7 is a cutaway view of the non-cyclonic separation stage, showing a radial fin inside the secondary dust collector.

The underside of the baffle 330 is also scooped, to form a guide surface 330a. This guide surface 330a promotes a re-circulation path R for the air inside the secondary dust collector 110, which re-circulation path is in contra-flow with the airflow through the flow bend 250 (see FIG. 6). Consequently, dust which is separated out in the flow bend 250 tends to be dragged down into the secondary collector 110 by the re-circulating flow A inside the secondary dust collector 110. This reduces the chance of immediate re-entrainment of the dust back into the flow bend 250, improving separation efficiency.

The air exiting the primary may maintain a degree of residual cyclonic swirl about the axis Y which may, at least in certain circumstances, compromise the specific performance of the flow bend 250. To inhibit this swirl, a series of radial fins 350 are provided inside the secondary dust collector 110, extending along the axis Y. The radial fins 350 span the annular diameter of the secondary dust collector 110, effectively to partition the secondary dust collector 110 into separate compartments. The radial fins 350 extend up into the flow bend 250, thus also partitioning the flow bend 250 to inhibit residual cyclonic swirl about the axis Y inside the flow bend 250 itself. Smaller fins may be provided which nevertheless inhibit the residual swirl of the airflow, at least to a degree. For example, fins may be provided only in the flow bend 250 itself, but which do not extend down further into the secondary dust collector 110.

The invention claimed is:

1. A vacuum cleaner comprising a vac motor and a separating assembly for separating out dust particles entrained in an airflow drawn through the separating assembly by the vac motor, the separating assembly being a multi-stage separating assembly comprising a primary separation stage and a secondary, non-cyclonic separation stage which is downstream of the primary separation stage, the non-cyclonic separation stage comprising a flow bend for changing the direction of the airflow thereby to separate out dust particles entrained in the airflow, a primary dust collector being provided for collecting dust particles separated out by the first separation stage, a secondary dust collector being provided for collecting the dust particles separated out by the flow bend, wherein the primary dust collector at least partly surrounds the secondary dust collector.

2. The vacuum cleaner of claim 1, wherein the primary separation stage is a cyclonic separation stage.

3. The vacuum cleaner of claim 2, wherein the primary separation stage is a single-cyclone stage comprising an annular bin, an upper part of the annular bin defining an annular cyclone chamber and a lower part of the annular bin defining the primary dust collector, the secondary dust collector being nested inside the annular bin.

4. The vacuum cleaner of claim 1, wherein the secondary dust collector comprises an opening, the flow being formed by a partition which divides the opening into a flow bend inlet and a flow bend outlet, the partition extending part-way into the secondary dust collector so that the airflow entering through the flow bend inlet is then forced to bend around the partition inside the secondary dust collector before exiting through the flow bend outlet.

5. The vacuum cleaner of claim 4, wherein the opening to the secondary dust collector is annular or circular, the partition extending around a full circumference of the opening so as to define an annular flow bend inlet and annular flow bend outlet.

6. The vacuum cleaner of claim 5, in which the flow bend inlet is formed between the partition and an outer wall of the secondary dust collector.

7. The vacuum cleaner of claim 5, in which the secondary dust collector is annular, and the flow bend outlet is formed between the partition and an outer wall of the secondary dust collector.

* * * * *